Figure 1:
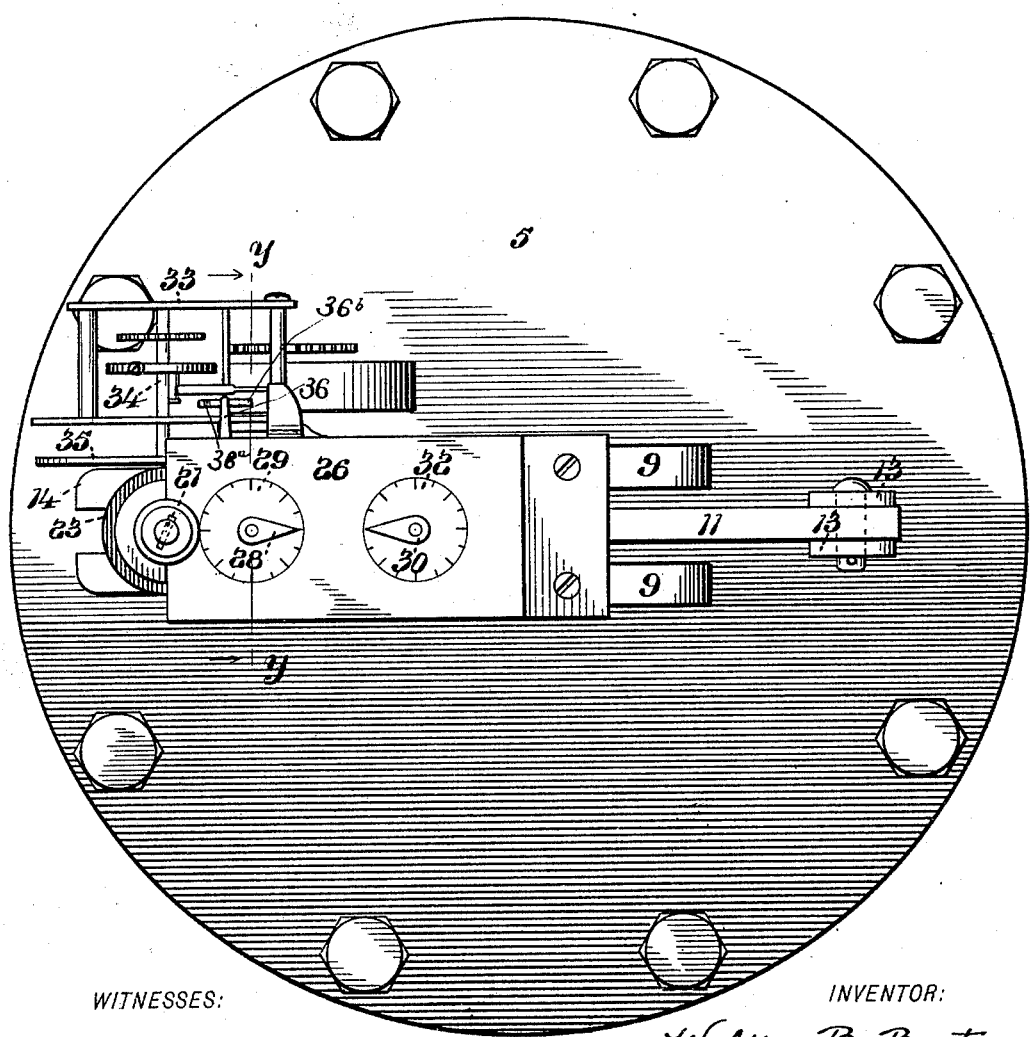

(No Model.) 6 Sheets—Sheet 1.

W. B. BARTRAM.
DIAPHRAGM WATER METER.

No. 509,508. Patented Nov. 28, 1893.

WITNESSES:
C. M. Newman,
A. J. Tanner.

INVENTOR:
Walker B. Bartram
BY
S. H. Hubbard
ATTORNEY (No Model.) 6 Sheets—Sheet 3.

W. B. BARTRAM.
DIAPHRAGM WATER METER.

No. 509,508. Patented Nov. 28, 1893.

WITNESSES:
C. M. Newman
A. J. Tanner

INVENTOR:
Walker B. Bartram
BY
D. H. Hubbard,
ATTORNEY

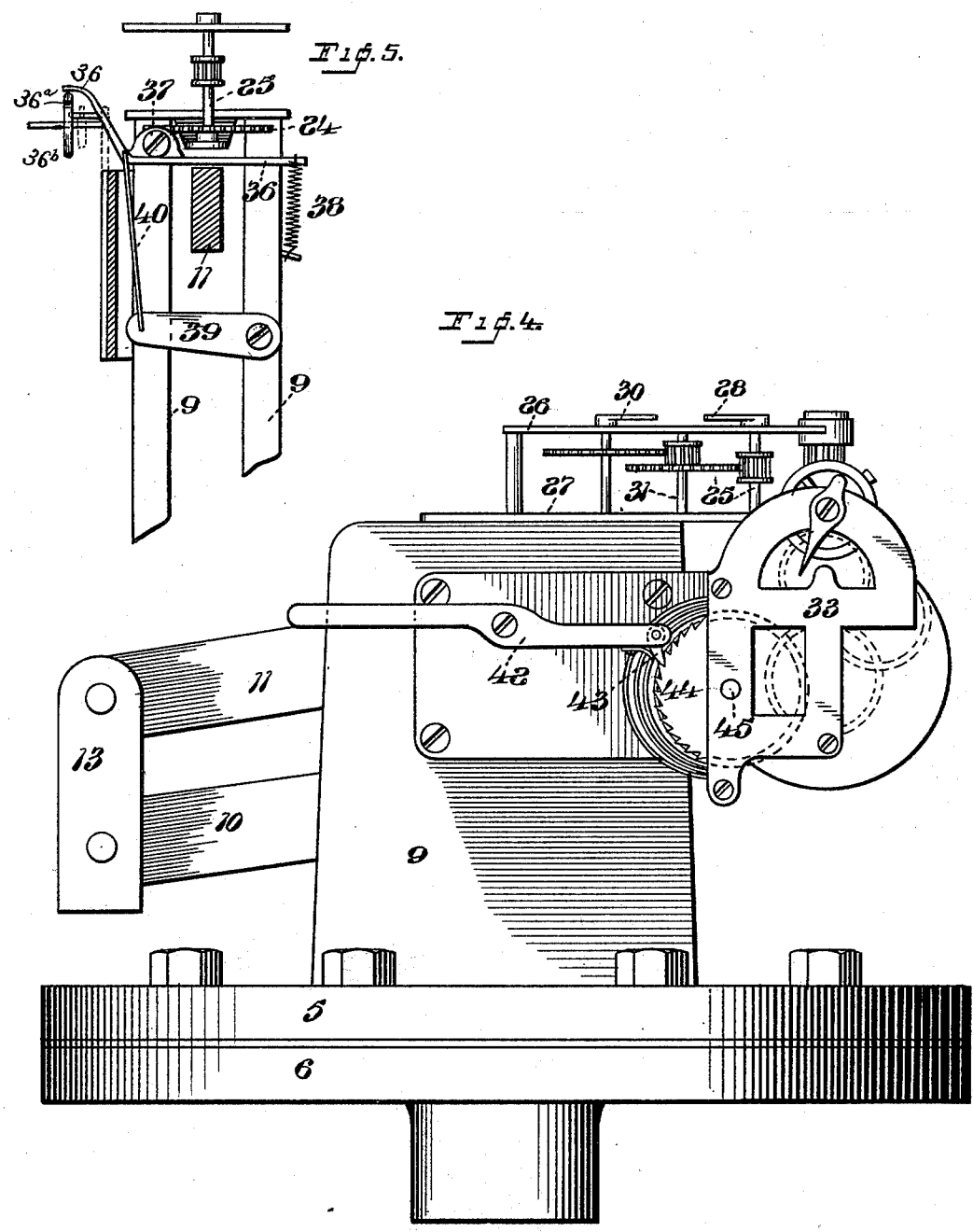

(No Model.) 6 Sheets—Sheet 5.

W. B. BARTRAM.
DIAPHRAGM WATER METER.

No. 509,508. Patented Nov. 28, 1893.

WITNESSES:
C. M. Newman
A. J. Tanner

INVENTOR:
Walker B. Bartram
BY
D. H. Hubbard
ATTORNEY

THE NATIONAL LITHOGRAPHING COMPANY,
WASHINGTON, D. C.

(No Model.)  6 Sheets—Sheet 6.
W. B. BARTRAM.
DIAPHRAGM WATER METER.
No. 509,508. Patented Nov. 28, 1893.
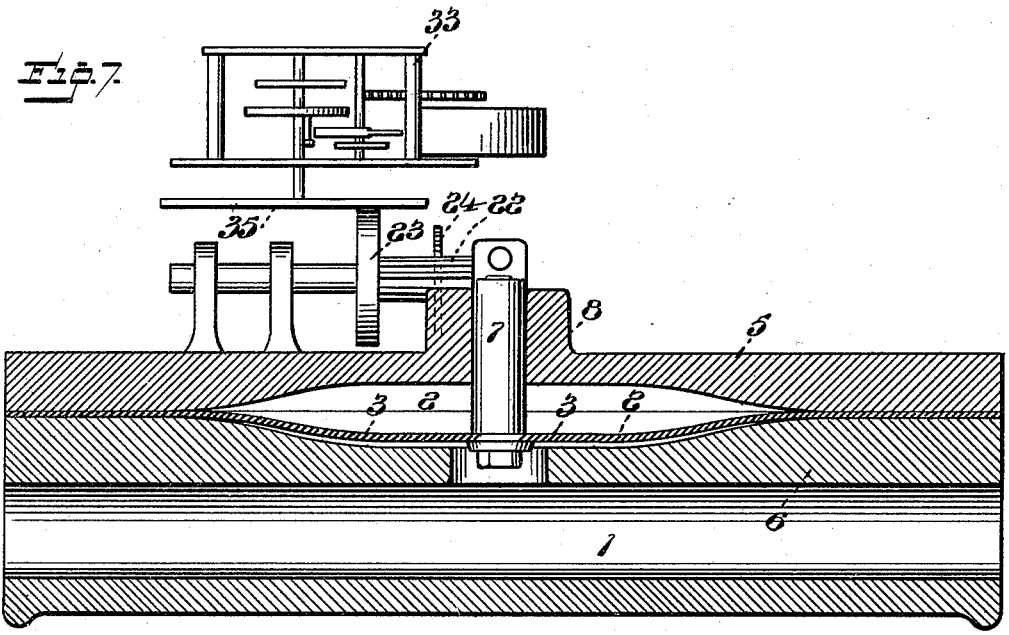
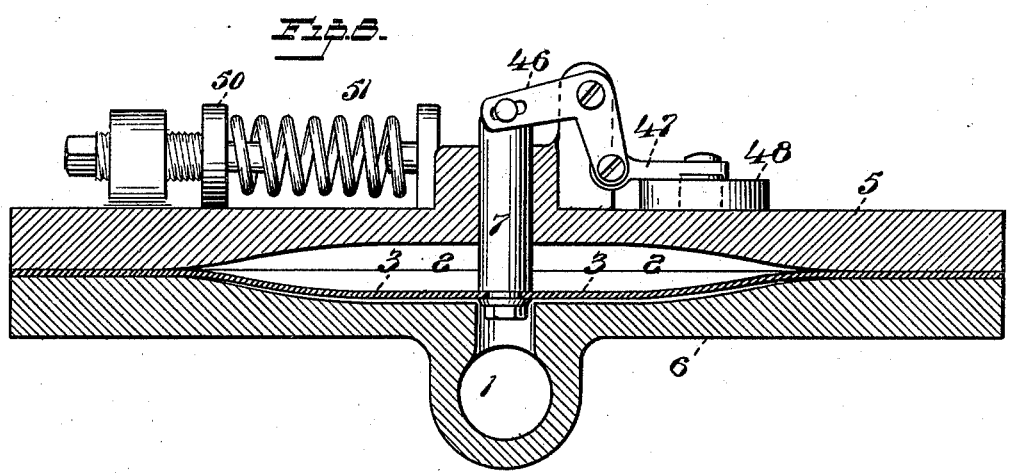
WITNESSES:
C. M. Newman
A. J. Tanner.
INVENTOR:
Walker B. Bartram
BY
D. H. Hubbard,
ATTORNEY
THE NATIONAL LITHOGRAPHING COMPANY,
WASHINGTON, D. C.

UNITED STATES PATENT OFFICE.

WALKER B. BARTRAM, OF REDDING, ASSIGNOR OF ONE-HALF TO MORGAN CHITTENDEN, OF DANBURY, CONNECTICUT.

DIAPHRAGM WATER-METER.

SPECIFICATION forming part of Letters Patent No. 509,508, dated November 28, 1893.

Application filed June 27, 1892. Serial No. 438,150. (No model.)

*To all whom it may concern:*

Be it known that I, WALKER B. BARTRAM, a citizen of the United States, residing at Redding, in the county of Fairfield and State of Connecticut, have invented certain new and useful Improvements in Meters; and I do hereby declare the following to be a full, clear, and exact description of the invention, such as will enable others skilled in the art to which it appertains to make and use the same.

This invention relates to certain new and useful improvements in meters for use in measuring fluids, such as water, air, gas, steam and the like. The principle upon which this instrument operates is that of determining the pressure in the pipe through which the fluid to be measured passes, and then to calculate by certain automatic means from this pressure the cubical flow, and to register the same upon suitable dials.

The objects of the invention are, first, to provide an instrument in the nature of a pressure gage which shall communicate movement in direct proportion as the pressure varies in the flow pipe; second, to communicate the movement of the part directly acted on by the pressure to certain intermediate devices; third, to communicate the motion of these elements to a registering train whose movement shall be governed and its speed varied in a manner and to an extent determined by the pressure in the flow pipe.

Another object of the invention is to arrange for the stoppage of the registering devices at the time when no usage of water or other fluid is taking place, and also to provide for the non-rotation of the registering train when the pressure in the flow pipe is entirely relieved, as for instance when the fluid is shut off at a point above the meter. But between these two extremes, as will be presently described, the registering devices will move proportionally with the fluid pressure.

With the ends hereinbefore set forth in view the invention consists and resides in the general features of construction and in the several combinations of co-operating elements hereinafter to be fully explained in detail and then recited in the claims annexed to this specification.

In order that those skilled in the art to which this invention appertains may fully understand its construction and method of operation, I will proceed to describe these in detail, reference being had to the accompanying drawings and the characters marked thereon which form a part of this specification, the same characters being used to designate like parts in the various figures.

Figure 2:
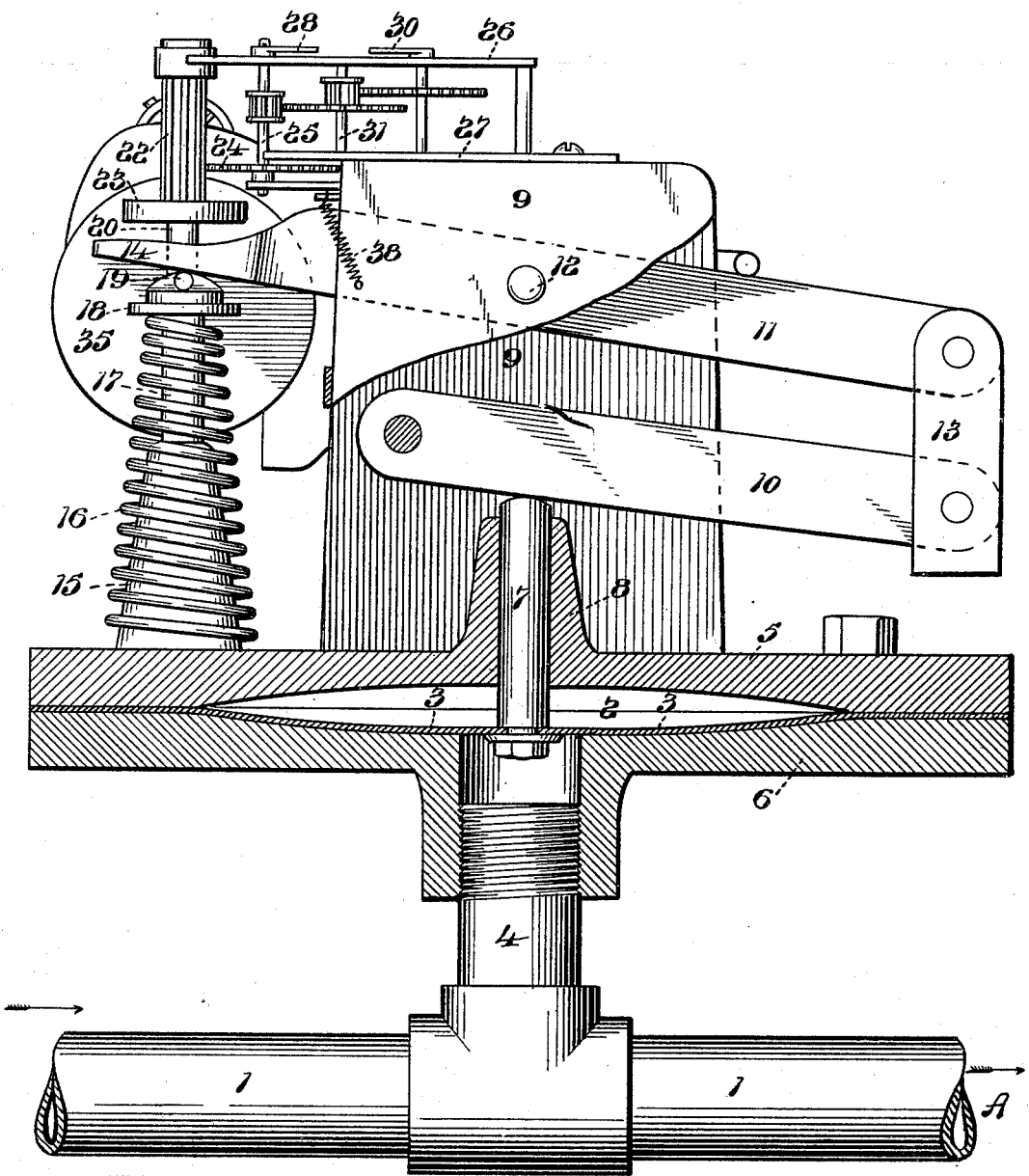
Figure 3:
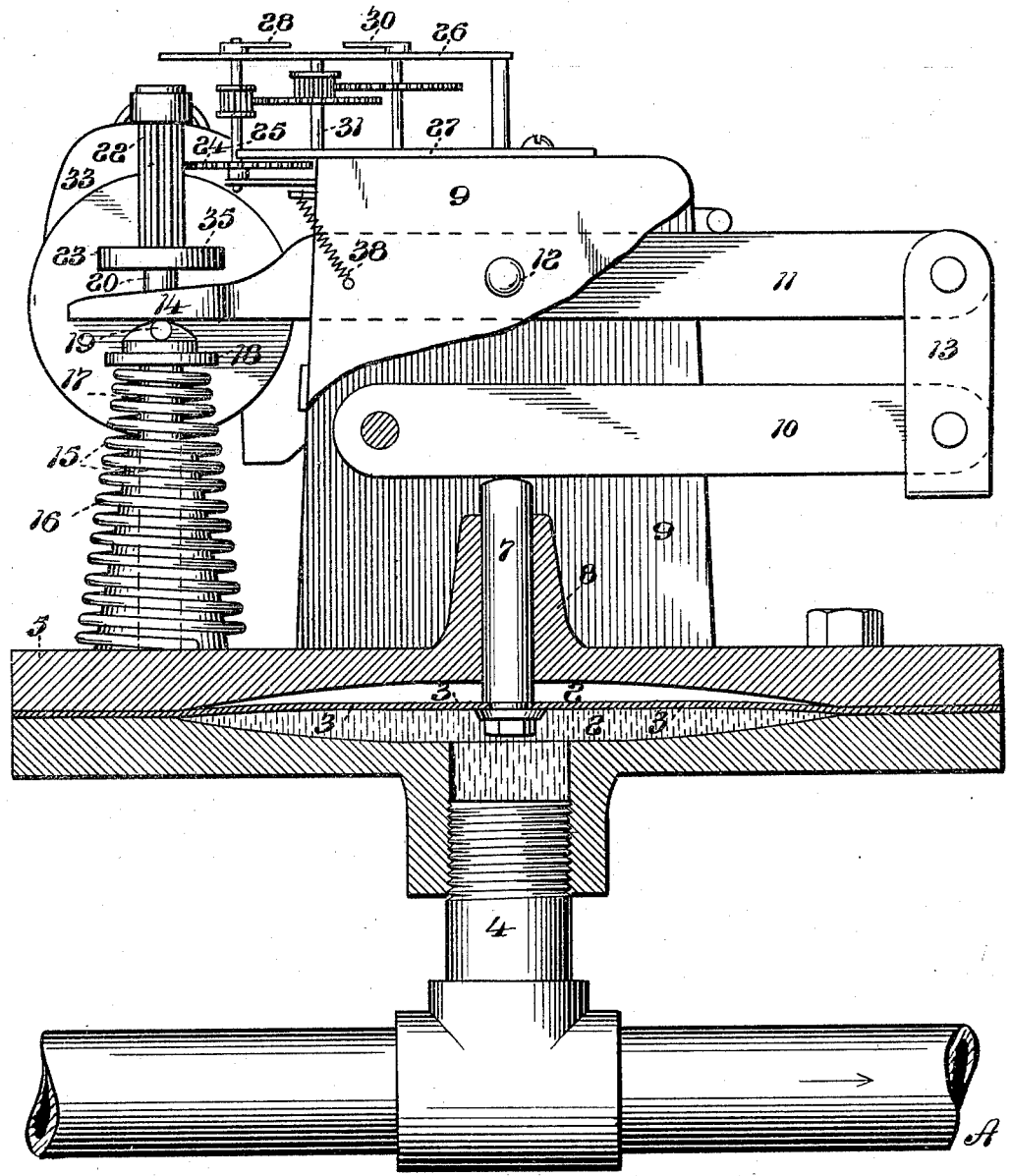
Figure 6:
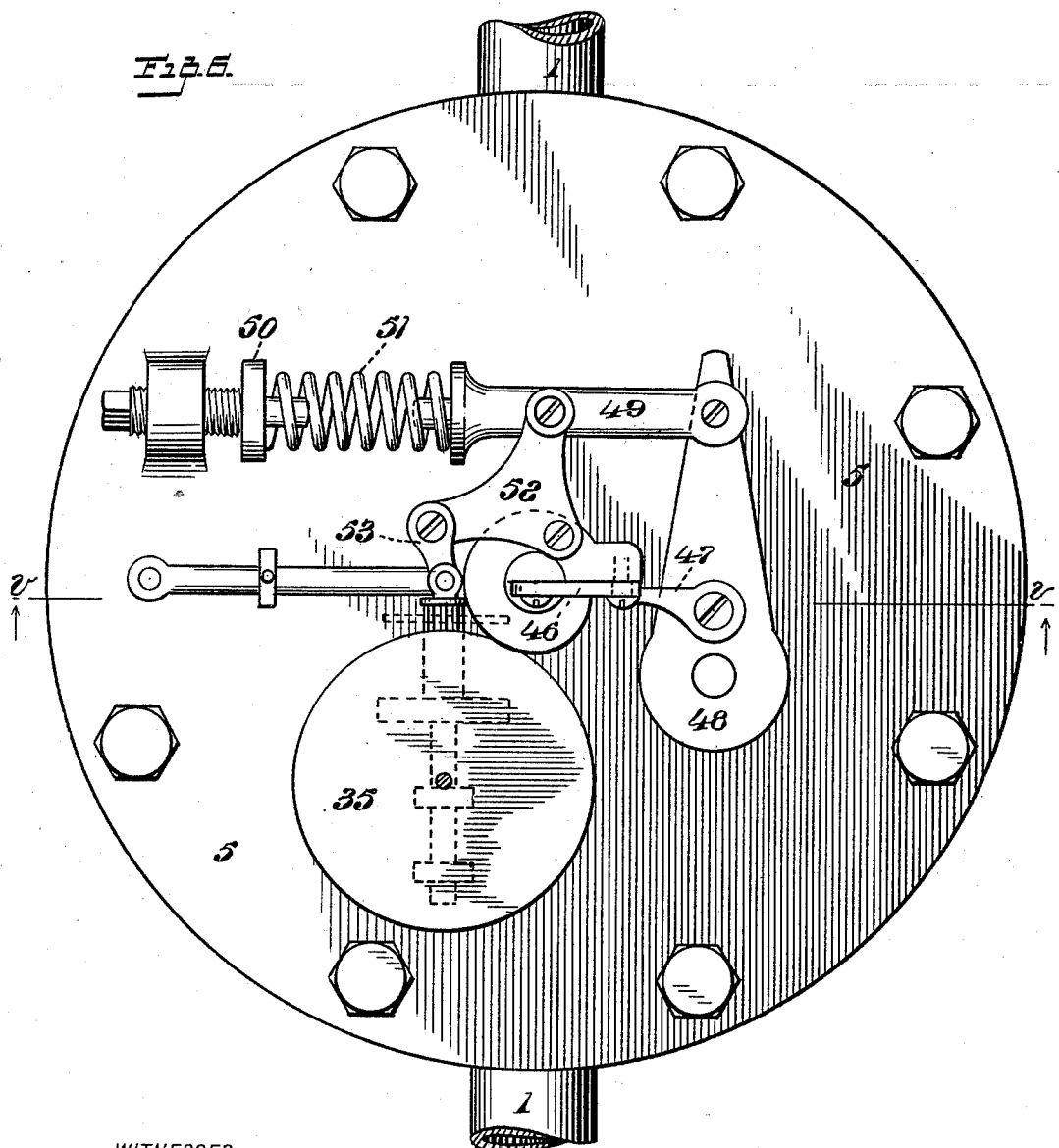

Figure 1, is a plan view. Fig. 2, is a side elevation with certain parts in section, looking from the lower side of Fig. 1; Fig. 3, a view like Fig. 2, but with the parts in a different position. Fig. 4, is another side elevation looking from the upper side of Fig. 1. Fig. 5, is a section taken at the line $y-y$ of Fig. 1, looking in the direction of the arrow. Fig. 6, is a plan view showing a machine of modified construction as compared with that of the preceding figures, but operating on the same principle. Figs. 7 and 8, are sectional views of the construction shown at Fig. 6, taken on the line $v-v$ and in opposite directions therefrom.

I desire it to be understood that the drawings in this application show two forms only of the many forms in which my invention may be embodied, and I do not desire to be limited to the construction shown or to any particular and specific combination of co-operating parts, since these may be freely changed and varied in proportion and arrangement without departing from the essentials of my invention, which consist of the piston rod and diaphragm, the registering train, and connecting mechanism whereby the position of the piston rod and diaphragm on the one hand varies the speed of the registering train on the other hand.

Referring now to Figs. 1, 2, 3 and 4, 1 denotes the flow pipe through which the fluid passes, and with this pipe I connect a pressure chamber 2 which contains a diaphragm 3. This connection may conveniently be made by means of a short branch pipe 4 which serves not only for purposes of communication, but will also support the meter. The pressure chamber I prefer to form by securing together two plates 5 and 6 whose centers are hollowed out to form the chamber and between whose abutting edges the diaphragm 3 is held. To the center of the diaphragm I connect a plunger or piston rod 7 which has a bearing in a hub 8 formed on top of the plate 5, and whose end projects above the top of this hub. As will be readily understood, any alteration of pressure will vary the position of this piston rod. For instance when, as shown at Fig. 2, there is no pressure in the pipe 1, the diaphragm will be in its lowest position and the piston rod will project very slightly above the hub; but on the other hand when the pressure is considerable, as shown at Fig. 3, the diaphragm will be raised as shown at that figure, and the piston rod will be lifted in proportion.

9 are standards which for convenience of construction I prefer to mount close together upon the plate 5 with sufficient space between them for the piston rod. Fulcrumed between these standards is a lever 10 whose lower edge is engaged by the extremity of the piston rod, and I prefer that the point of engagement shall be as shown, about one-quarter distance from the fulcrum of said lever to its free end. Above this lever 10 is another lever 11 of somewhat greater length. It is fulcrumed at about its center, as shown at 12, and it is connected to the lever 10 by means of a link 13. The other end of this lever 11 is bifurcated, as shown at 14, Fig. 1. In front of the standards referred to and preferably in line with the space between them, is a pillar 15 about which is arranged a spiral spring 16. The pillar just referred to is hollow and in it is seated a sliding rod 17 whose upper end bears a collar 18 the lower side of which latter engages the upper end of the spring. Through this collar for the purpose of affording a smooth bearing surface, is a pin 19 upon which the end of the lever 11 is adapted to rest. The collar 18 just referred to bears an upwardly projecting stem 20 and in this is journaled a short shaft 21, which carries a cage pinion 22 at whose lower end is secured a friction wheel with an edge 23 preferably of rubber or other elastic material, and whose purpose will be presently explained. This disk appears in plan view at Fig. 1 and in edge elevation at Figs. 2 and 3. The cage pinion just referred to engages a gear wheel 24 on a shaft 25, which latter is journaled, as appears at Figs. 4 and 5, between two plates 26 and 27 set on top of the standards. The shaft 25 bears upon its upper end above the plate 26 a hand or pointer 28 which swings over a dial 29 on the top of the plate 26. Through a suitable reducing mechanism, which is shown in Fig. 4, the shaft 25 drives another shaft 31 which carries a pointer 30 on its upper end, and this hand or pointer swings over a dial 32. These dials may bear any suitable relation one to the other and may register the flow by any suitable unit, such as the gallon or cubic foot, and if required more dials may be added having any suitable connection between them.

The construction interposed between the large cage pinion and the dials has not been more particularly described for the reason that it forms no part of my invention and any other suitable connections may be substituted therefor.

For the purpose of driving the large cage pinion and therethrough the registering mechanism I mount in any convenient manner upon one of the standards a time-keeping movement which need not be of any specific construction and which I denote in the drawings as a whole by the numeral 33. Upon the ultimately driven shaft of this movement, which would carry the hour hand if the movement were used in an ordinary clock, and which shaft I here designate by 34, I mount a friction disk 35 of considerable size whose face is impinged by the periphery of the elastic friction disk 23 carried by the cage pinion. This appears at Figs. 1, 2 and 3 and the difference between the positions in which the disk is shown in Figs. 2 and 3 is to be observed. The clock movement runs at such time when the fluid is being drawn and ceases to run when the flow of water is cut off. In the event that the flow pipe is emptied and the pressure upon the diaphragm is relieved, I provide a stop mechanism which I will now describe, and which is shown particularly at Fig. 5. It consists of a stop lever 36 fulcrumed to the face of one of the standards 9, as at 37, or to some other stationary part in such manner that when its rear end is raised by lever 11 acting upon stop lever 36, caused by the pressure of water effected by the stoppage of flow through pipe A, its nose will be depressed into engagement with a single notch $36^a$ upon the periphery of a wheel $36^b$ of the movement, this notch would be placed upon the wheel so as to stop the movement at the extreme position of the balance wheel until the upward pressure on the rear end of the lever 36 is removed by the flow of water through pipe A, which releasing, the tension on spring 38 forces stop lever 36 back to its normal position and starts the clock movement. This upward movement of the lever 36, as explained, is effected by lever 11. It may be convenient to provide also for the stopping of the clock movement at the other end of the throw of the lever 11, and this I have provided for in Fig. 5 by means of a movable hinged bar 39 which I connect to the lever 36 in front of the fulcrum point of the latter by a wire or similar connection 40. It will be readily seen that this arrangement is such that any upward movement of the lever 11 sufficient to raise the lever 36 will stop the clock movement, as before explained, and likewise any downward movement of the lever 11, produced as explained, which will depress the bar 39 will have the same effect. Between these two extreme positions of the lever 11 the clock movement, as heretofore stated, is forced to run.

My invention operates as follows: When the meter is set in position, as shown at Fig. 2, and there is no water in the pipe, the cage pinion 22 will be forced upward by its spring 16 carrying with it the lever 11, which raises lever 36, so that the movement will not run. When the full head of fluid is turned on the upward pressure of the diaphragm, acting through the levers 10 and 11, should be enough to just depress the cage pinion to a degree sufficient to bring the friction disk 23 into contact with the large disk 35 at the exact center of the latter, and for this purpose the power of the spring 16 should be adjusted in proper relation to the head of water in the service pipe; or a weighted lever may be used instead of the spring to counterbalance the fluid pressure. Now if the clock movement be not stopped by the use of the connections 39 and 40, which as before stated may or may not be employed, the rotation of the disk 35 will not turn the disk 23 and the pinion 22 because, as just stated the point at which the periphery of the disk 23 impinges the disk 35 is the exact center of the latter. Now if the faucet be opened, say at the point A at the right of Fig. 2, and the fluid permitted to flow, the upward pressure upon the diaphragm 3 will be relieved precisely in proportion to the size of the escape orifice opened, and this will permit the diaphragm to drop slightly and permit the spring 16 to raise the lever 11 and with it the cage pinion and the friction disk 23, which, as soon as it leaves the center of the disk 35, will be driven by its contact with the latter at a speed which will vary according as it is moved farther or less far from the center. That is to say, a slight reduction of the pressure in the chamber, which would be caused by opening the faucet slightly, would result in moving the disk 23 a very little distance from the center of disk 35, which latter under those conditions would drive it slowly and cause the cage pinion to drive the register slowly. As the flow is increased at the faucet the pressure in the chamber will be correspondingly decreased, and the friction disk 23 still further raised so that it impinges the friction disk 35 at a point nearer the periphery of the latter, and will consequently be driven at a much higher rate of speed, which rate of course is communicated to the registering mechanisms. Thus it will be seen that every variation of pressure changes the position of the driven disk 23 upon the driving disk 35, and therefore while the disk 35 is always revolving at a fixed rate, the registering mechanism is driven at a rate which varies directly with the pressure in the chamber which contains the diaphragm. The length of the cage pinion 22 is sufficient to keep it always in engagement with the gear 24 without regard to the position of the levers 10 and 11.

I have not attempted to explain the exact rotation which the hands in the registering mechanism will have relative to the cage pinion and the disk 23, since this will obviously vary with the size of the disk and the general construction of the parts.

I have taken advantage of the fact that under the ordinary variations of pressure the lever 11 will be constantly raised and lowered to cause this lever to effect the winding of the movement, and while this may be readily done by various combinations of mechanical elements I show in Fig. 4 a simple and efficient means for this purpose, which consists of a lever 42 fulcrumed alongside one of the standards 9 and having on its rear end a lateral projection not shown in the drawings which engages the top of the lever 11. The other end of this lever I furnish with a spring actuated pawl 43 which engages a ratchet wheel 44 secured upon the winding shaft 45 of the time keeping movement. Whenever the lever 11 raises the lever 42 the pawl will turn the toothed wheel 44 to the extent of one or more teeth and the ordinary detent common in connection with the winding shaft of ordinary clocks will prevent retrogression. Thus at every considerable change of the pressure the winding process goes on, and as the lever descends the lever 42 follows it down and remains in contact with it by reason of the greater weight of its rear end.

In Figs. 6, 7 and 8 I have shown another and slightly different form in which my invention may be embodied. The piston rod actuated by the diaphragm is the same, but its upper end is connected to one arm of a bell crank lever 46 whose other end, by means of a link 47, is connected to a lever 48 which lies flat upon the top of the plate. This lever is fulcrumed at one end to said plate, the link is attached thereto near its center and to the outer end of said lever is fulcrumed a rod 49 between which and an adjustable abutment 50 is interposed a spiral spring 51 whose function is the same as that of the spring shown in the other construction, namely, to substantially balance the water pressure. To the rod 49 is secured one end of a bell crank lever 52 whose elbow is fulcrumed to some stationary part, as for instance the hub which surrounds the piston, and whose other extremity, by means of a short link 53, is connected to the shaft upon which the long cage pinion and the elastic-faced disk are secured. In this construction the clock movement is the same as in the preceding figures, but its position is altered so that the large driving disk which co-operates with the smaller disk having the ratchet face is horizontal, and is set above the smaller disk, as appears in Fig. 7. A comparison of the two structures aided by the short description just inserted, makes the operation of this form so clear that it appears to me to be unnecessary to enter into any more detailed explanation of its organization, or to reiterate the description of the functions of the parts. They vary only in form and construction and arrangement, and they do not in any wise change the principle of operation upon which my invention is founded.

I am aware that meters have been constructed wherein pistons are used, but were directly actuated by the pressure of fluid to regulate the movement of a registering mechanism, and wherein the fluid whose pressure controlled the movements of the piston or pistons passed directly through the meter proper, and such construction I do not desire to claim, but I am not aware of a meter having been constructed prior to my invention with a flexible diaphragm, the undulations of which regulate the degree of movement of the registering mechanism, and wherein the fluid does not pass through the meter proper.

I claim—

1. In a fluid meter, a pressure chamber in communication with a flow pipe, a diaphragm and piston rod incased within said pressure chamber, and adapted to be varied in position by the pressure of fluid in the flow pipe, in combination with mechanism connected therewith consisting of levers linked together one of which is acted upon by a spring the other by the piston rod, the two for the purpose of transmitting movement to a registering train whereby the pressure or cubical flow of fluid is registered, substantially as shown and described.

2. In a fluid meter, the combination with the pressure chamber and flow-pipe in communication therewith as described, of a diaphragm and piston rod adapted to be varied in position by the fluid pressure, a spring counterbalance for said diaphragm, a register, and driving mechanism therefor, and disk 35 together with cage pinion 22, interposed between the register and diaphragm to regulate the speed of the former in accordance with the varying position of the latter, as specified.

3. A fluid meter comprising a water tight casing forming a pressure chamber 2, a piston rod mounted in said casing; levers 10, and 11, mounted in standards 9, connecting said rod with a clock like registering device, a friction disk upon said meter, to determine the speed of the registering mechanism according to the varying position of the diaphragm, all substantially as described.

4. In a fluid meter having a register consisting of a train of wheels, dials, pointers, &c. in combination with a clock movement regulating the speed of the register, a stop and starter, so arranged as to engage and disengage with the levers on the balance wheel shaft, or its equivalent while it is at one extreme of its vibratory throw and start and stop the clock and register, as the fluid begins, and ceases to flow, substantially as shown and described.

5. In a fluid meter, a pressure chamber having a vibratory diaphragm and piston rod, and a register consisting of a train of wheels, dials, pointers, &c., in combination with mechanism connected with a lever which if acted upon by the rod connected to the diaphragm, connecting the registering mechanism with the diaphragm, whereby said mechanism may be automatically wound up as the diaphragm vibrates by the action of the fluid, substantially as described.

6. In a fluid meter, the combination with the diaphragm, of the levers operated by said diaphragm in one direction, a spring whereby said levers are operated in opposition to the diaphragm, a regularly speeded motor, such as a clock movement, a friction disk carried by said motor, a register having a friction disk upon its primary shaft, and engaging the complementary friction disk, and a connection between the levers and the register friction disk whereby the latter is moved vertically toward and away from the center of its driver.

In testimony whereof I affix my signature in presence of two witnesses.

WALKER B. BARTRAM.

Witnesses:
G. FRED LYON,
C. E. LYON.